(No Model.) 2 Sheets—Sheet 1.
W. W. HANSCOM, Dec'd.
A. P. Hanscom, Executrix.
AIR BRAKE RELIEF VALVE.
No. 416,603. Patented Dec. 3, 1889.
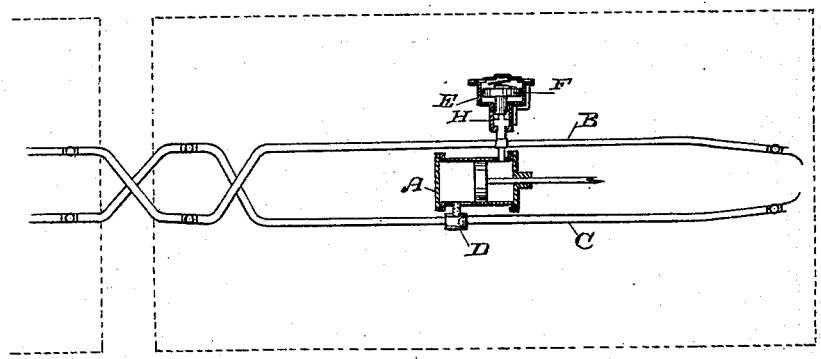
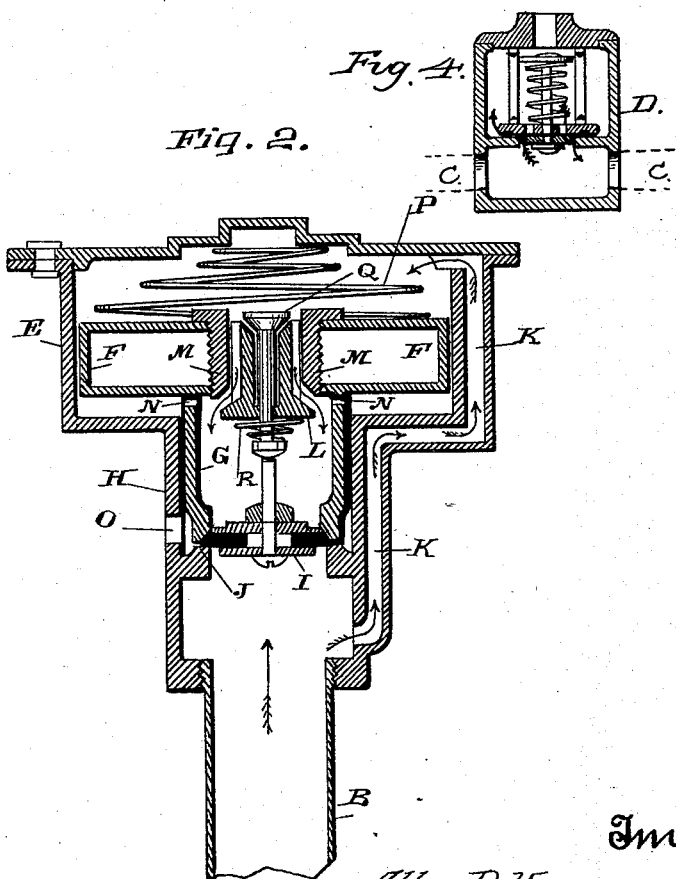
Witnesses,
Geo. H. Strong.
Inventor,
Abbie P. Hanscom, Executrix
of Wm. W. Hanscom, deceased,
By Dewey & Co.
Attys

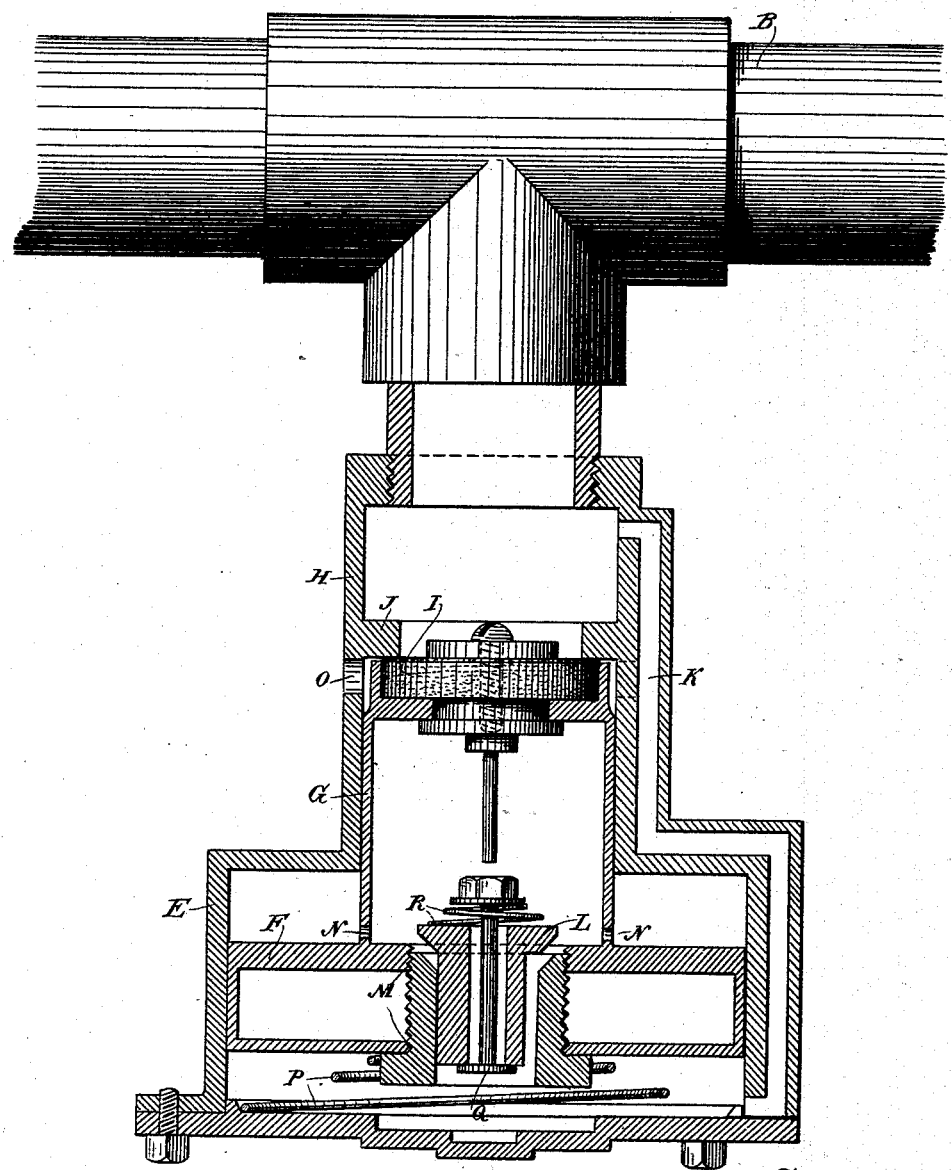

UNITED STATES PATENT OFFICE.

ABBIE P. HANSCOM, OF SAN FRANCISCO, (EXECUTRIX OF WILLIAM W. HANSCOM, DECEASED,) ASSIGNOR TO HENRY D. BACON, OF OAKLAND, CALIFORNIA.

AIR-BRAKE RELIEF-VALVE.

SPECIFICATION forming part of Letters Patent No. 416,603, dated December 3, 1889.

Application filed February 1, 1889. Serial No. 298,395. (No model.)

*To all whom it may concern:*

Be it known that WILLIAM WALLACE HANSCOM, deceased, late a citizen of the United States, residing at the city and county of San Francisco, State of California, invented an Improvement in Air-Brake Relief-Valves, of which the following is a full, clear, and exact description.

This invention relates to certain improvements in air-brake mechanism for railway-trains; and it consists of a relief-valve in connection with each of the brake-cylinders, whereby the air which is released from one end of the brake-cylinder when the brakes are to be put on is allowed to escape instantly without passing back through the train-pipe to the engine.

The present invention is especially applicable to a brake mechanism in which no storage or train reservoirs are used, and for which a patent was issued to W. W. Hanscom, dated September 22, 1885.

Referring to the accompanying drawings for a more complete explanation of the invention, Figure 1 is a view showing the relative arrangement of the brake-cylinder, train-pipes, air-valve, and the relief-valve, the car being indicated in dotted lines. Fig. 2 is an enlarged section taken through the plane of the axis of the relief-valve and valve-casing. Fig. 3 is an enlarged sectional view showing particularly the valve-casing E and adjunctive parts. Fig. 4 is a sectional view of the valve-chamber D.

A is a brake-cylinder, which is fixed beneath the car and has a piston with a piston-rod extending out through one end of the brake-cylinder and connected with the mechanism whereby the brakes are applied to the wheels of the car in the usual manner.

B and C are the two train-pipes through which the air is compressed by means of the air-pump upon the engine and within the control of the engineer.

The pipe C is connected with the valve-chamber D, through which the air passes, and this valve-chamber contains a valve through which air is admitted into one end of the brake-cylinder. The other train-pipe B is connected with the opposite end of the brake-cylinder, so that when air is admitted equally through both of the pipes B and C the piston will remain balanced.

By means of the engineer's valve air may be allowed to escape from one end of the cylinder through the pipe B, while the pressure is continued through the pipe C and the valve D, so as to apply the brakes, as described more fully in the former specification.

In case of a long train there is considerable delay when the air which is allowed to escape from the cylinder in order to apply the brakes must pass through the long train-pipe B and back to the engineer's valve before it can leave the pipe, and the present invention is designed to remedy this difficulty by introducing an automatically-operating relief-valve at or near each cylinder, so that the variation in pressure in the two train-pipes which applies the brakes will immediately allow the air to escape through this valve.

E is the casing or cylinder within which the valve-actuating piston F is fitted. This piston has an extension G, which is fitted to move in a corresponding extension H of the valve-casing. At the end of this extension opposite the piston is a valve I, formed of rubber or other material which will make a tight joint upon the seat J in the extension. This casing H, which extends somewhat beyond the valve-seat, as shown, is connected directly with the train-pipe B, so the air is admitted into its rear end, and by means of the passage K along one side of the valve-chamber this air is conveyed to the front of the piston F, acting upon its surface, and thereby closing the valve I at the end of the extension G tightly against its seat, because the piston is of larger diameter than the valve at the end of the extension. This piston and extension may be made hollow, and the valve L is fitted to the center of the piston, opening inwardly. For convenience this valve is shown as fitted into a supplemental valve-seat M, which screws into the center of the piston and may be easily removed whenever it is necessary for any purpose.

Small holes N are bored through the inner side of the piston, preferably, as shown in the present case, at the junction of the piston with the extension G, so that air which is admitted through the valve L may pass out through these holes N and enter the cylindrical valve-chamber behind the piston F.

Holes O are formed in the sides of the extension H of the valve-casing near to the valve-seat J, through which air may escape from the brake-cylinder when this valve is opened.

The operation will then be as follows: Air is admitted into the train-pipes C and B in the usual manner, and the air which passes through the pipe B, entering the valve-cylinder extension H, passes through the pipe or passage K and is admitted into the end of the valve-cylinder E which is opposite to the extension H, thus pressing upon the surface of the piston F which presents the greatest area. This pressure serves to keep the valve I closed tightly upon the seat J. At the same time the valve L is opened inwardly by this pressure, and air passes into the interior of the cylinder E and behind the piston F until the pressure upon the two sides is equal. As the diameter of the extension G and the valve I is taken out from the diameter of the piston F, the pressure upon the greater area of the outer face of F will tend to keep the valve I closed, and in this it is assisted by the spring P, which is fitted into the end of the cylinder E, so as to press upon the face of the piston F. So long as the pressure in the pipe B remains undisturbed the valve I will remain closed by reason of the pressure of the air upon the face of the piston F; but as soon as the engineer's valve is opened and the pressure in the pipe B is reduced the air escapes through the passage K and relieves the pressure upon the outer face of the piston F. The pressure on the inner face of the piston F, however, is not thus relieved, because the air is confined within the cylinder behind the piston by the closing of the valve L upon its seat M, and this pressure is then exerted upon the rear face of the piston, forcing the latter forward and thus opening the valve I, which allows air to escape immediately from the brake-cylinder through this valve and through the openings O to the outer air without being obliged to pass through the train-pipe. As soon as the pressure is again admitted into the pipe B it acts through the passage K upon the face of the piston F and again closes the valve I, as before. In case the air-pressure at any time should be reduced considerably below that which had been formerly used upon the piston F, the pressure upon the front and back of this piston is balanced by means of a second valve Q, which fits into a seat formed within the valve L, this valve Q opening outwardly and in the opposite direction to that in which the valve L opens. A spring R of sufficient tension keeps the valve Q closed, so that it will act only as a part of the valve L, unless the pressure behind the piston F becomes excessive and sufficient to overcome the tension of the spring R, when this valve Q will be opened sufficiently by this pressure to allow it to be equalized with that from the front.

By this construction the brakes are operated through the medium of the brake-cylinders beneath the cars and the train-pipes and by means of the relief-valve to allow the air to escape quickly and the brakes to be applied without waiting for the air to pass through the whole length of the train.

Having thus described the invention, what is claimed as new, and desired to be secured by Letters Patent, is—

1. In an air-brake mechanism, the combination of a brake-cylinder having a piston and a piston-rod, independent train-pipes conveying air under pressure, one of said pipes being connected directly with one end of the brake-cylinder and the other through a valve with the opposite end, and a valve adjacent to the exhaust end of the brake-cylinder and connected with the train-pipe which opens into that end, said valve being opened automatically when pressure is reduced in its connecting-pipe, substantially as described.

2. In air-brakes, the combination of a brake-cylinder with a piston and piston-rod, independent pipes conveying air under pressure into opposite ends of the cylinder, whereby the piston is balanced, a valve seated within a chamber adjacent to the exhaust end of the brake-cylinder, having a piston connected with it, whereby the two move in unison, an independent passage connected at one end with the train-pipe and discharging at its opposite end on one side of the valve-piston, and a second valve opening inwardly through the valve-piston to admit the air behind said piston, substantially as and for the purpose described.

3. In air-brakes, the combination of a brake-cylinder, piston, piston-rod, independent air-pipes connected with said cylinder at opposite ends, a cylinder adjacent to the brake-cylinder and connected with the air-supply pipe at the exhaust end of the brake-cylinder, an extension of said second cylinder having a valve-seat, a piston within said second cylinder, a valve moving with the piston, an independent passage connected with the train-pipe and discharging on one side of the valve-piston, and an escape-opening leading to the atmosphere, substantially as described.

4. In air-brakes, the combination of a cylinder provided with a piston, a piston-rod, independent pipes through which air is admitted under pressure upon opposite sides of the piston, a valve seated within the pipe or passage which connects one of the main pipes with the exhaust end of the brake-cylinder, a piston F, fitting into a second cylinder and connected with said valve, a passage through which air is admitted from the main pipe to press upon the face of the piston F, and a second valve by which air is allowed to pass through this piston and produce a pressure upon opposite sides within its cylinder, substantially as described.

In witness whereof I, ABBIE P. HANSCOM, executrix of the estate of WILLIAM WALLACE HANSCOM, deceased, have hereunto set my hand as such this 17th day of January, 1889.

ABBIE P. HANSCOM,
*Executrix of the last will and testament of W. W. Hanscom, deceased.*

Witnesses:
    LEE D. CRAIG,
    F. A. BERLIN.